W. L. E. KEUFFEL.
SLIDE RULE RUNNER.
APPLICATION FILED DEC. 26, 1914.
1,181,672.
Patented May 2, 1916.
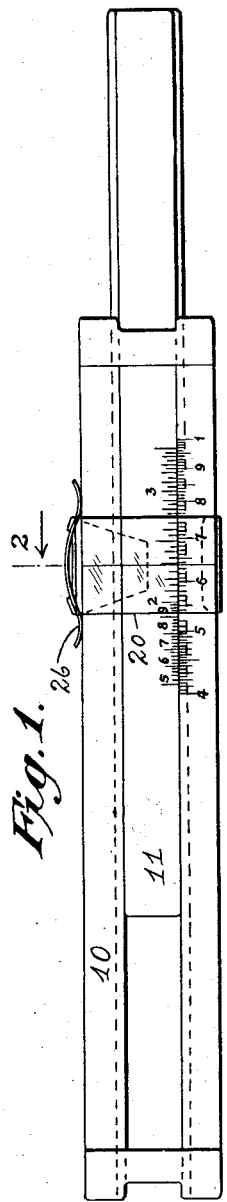
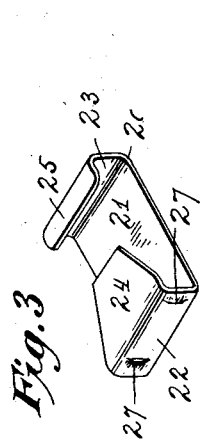
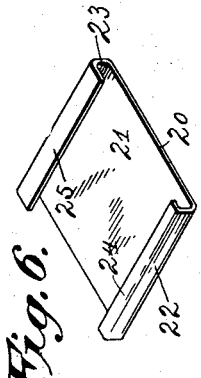
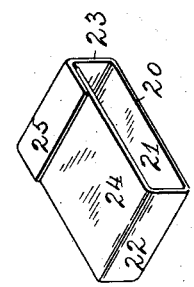
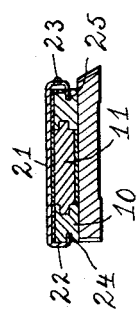
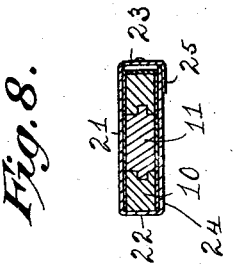
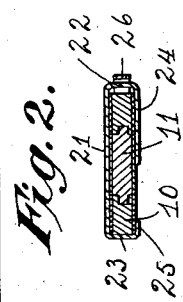
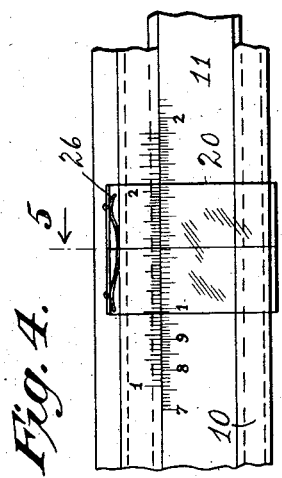
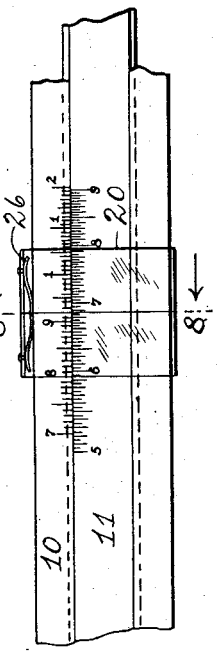
Attest:
Alda F. Miller
Helen V. Fitzpatrick
Willie L. E. Keuffel, Inventor:
by William R. Baird
his Atty

UNITED STATES PATENT OFFICE.

WILLIE L. E. KEUFFEL, OF HOBOKEN, NEW JERSEY.

SLIDE-RULE RUNNER.

1,181,672. Specification of Letters Patent. Patented May 2, 1916.

Application filed December 26, 1914. Serial No. 879,072.

*To all whom it may concern:*

Be it known that I, WILLIE L. E. KEUFFEL, a citizen of the United States, residing at Hoboken, in the county of Hudson and State of New Jersey, have invented certain new and useful Improvements in Slide-Rule Runners, of which the following is a specification.

This invention relates to runners for slide rules and its novelty consists in the construction and adaptation of the parts, as will be more fully hereinafter pointed out.

This application is a continuation as to certain features of the application for a patent, Serial No. 802,909 by a requirement of division of the Patent Office.

In the original application referred to, there is disclosed a slide rule runner having a transverse transparent panel extending across the space between the guiding devices, which devices secure the margins of the panels, the latter constituting a connection between the guide devices to hold them in position.

In this application, there is shown a form of the device, in which the slide rule runner comprises a single transparent sheet of elastic material such as celluloid, completely covering the face of the rule and bent over opposite edges thereof to engage the same or to engage the opposite face of the rule and which is retained in position by such engagement or by its own inherent elasticity. One of the edges of the runner is also shown as provided with slits adapted to receive a spring to promote the engagement between the runner and the edge of the rule.

In the drawings, Figure 1 is a side view of a slide rule and runner embodying my invention, Fig. 2 is a transverse section of the same on the plane of the line 2—2 in Fig. 1, and Fig. 3 is a perspective of the runner detached from the rule. Fig. 4 is a view similar to Fig. 1 of a different form of slide rule and a species of the runner especially adapted for use with such slide rule, Fig. 5 is a transverse section of the same on the plane of the line 5—5 in Fig. 4 and Fig. 6 is a perspective of the form of runner shown in Figs. 4 and 5. Fig. 7 is a side view of yet a different form of slide rule and a species of the runner, especially adapted for use therewith. Fig. 8 is a transverse section of the same on the plane of the line 8—8 in Fig. 7, and Fig. 9 is a perspective of the forms of runners shown in Figs. 7 and 8.

In the drawings there are shown slide rules of somewhat different construction. In each case, 10 designates the rule and 11 the slide. There are many different methods of arranging such parts, but they all have a rule and a slide. In the illustrations, the graduations are only indicated so as not to confuse the drawing. The runner in each case comprises a single sheet 20 of transparent material and preferably of a material like celluloid, which is also elastic and one side of which 21 is adapted completely to cover one face of the slide rule, and is bent over the edges of the slide rule as at 22 and 23 to embrace the rule and is then bent back upon itself as at 24 and 25 either to engage the opposite face of the rule as illustrated in the forms shown in Figs. 3 and 9 or to engage in recesses formed in the edges of the rule as illustrated in the forms shown in Fig. 6. In all of these forms the runner is adapted to engage the rule by its inherent elasticity, but in order to promote its engagement with the edge of the rule, it is provided with a spring intermediate such edge and the rule as indicated at 26. In the form shown in Fig. 3 the spring is adapted to pass through slits 27, 27 in the edge of the runner.

What I claim as new is:—

1. In a device of the character set forth, a support, and a runner thereon having portions bent over at opposite edges of the support, one of said bent-over portions being provided with an opening, and a spring secured in said opening and yieldingly engaging the support to promote frictional engagement between the runner and support.

2. In a device of the character set forth, a support and a runner thereon extending across the face of the support and having offset portions located along its opposite edges, one of said portions having spaced transverse slits, and a spring having spaced portions passing through the slits and held to the runner thereby, said spring slidably bearing against the adjacent portion of the support.

3. In a device of the character set forth, a support and a runner thereon extending across the face of the support and having offset portions located along its opposite edges, one of said portions having spaced transverse slits, and a bowed spring having its central portion outside the runner and having its terminal portions passing inwardly through the slits and engaging with the adjacent edge of the support on opposite sides of the runner.

4. A runner comprising a support inclosing boxing provided with means at one edge of the support to promote engagement of the support with the runner, including slits in the runner and a spring that passes through the slits to press against the edge of the rule and engaging the same by its own inherent elasticity.

In testimony whereof I affix my signature in presence of two witnesses.

WILLIE L. E. KEUFFEL.

Witnesses:
   OTTO FREUND, Jr.,
   BOWDEWINE B. VAN SICKLE.